US011087538B2

United States Patent
Qian et al.

(10) Patent No.: US 11,087,538 B2
(45) Date of Patent: Aug. 10, 2021

(54) PRESENTATION OF AUGMENTED REALITY IMAGES AT DISPLAY LOCATIONS THAT DO NOT OBSTRUCT USER'S VIEW

(71) Applicant: Lenovo (Singapore) Pte. Ltd., Singapore (SG)

(72) Inventors: Ming Qian, Cary, NC (US); John Weldon Nicholson, Cary, NC (US); Song Wang, Cary, NC (US); Jatinder Kumar, Cary, NC (US); David Alexander Schwarz, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/018,351

(22) Filed: Jun. 26, 2018

(65) Prior Publication Data

US 2019/0392640 A1 Dec. 26, 2019

(51) Int. Cl.
*G06T 19/00* (2011.01)
*G06T 7/70* (2017.01)
(Continued)

(52) U.S. Cl.
CPC ........ *G06T 19/006* (2013.01); *G06K 7/10722* (2013.01); *G06K 7/1417* (2013.01);
(Continued)

(58) Field of Classification Search
CPC ......... G06T 19/006; G06T 7/70; G06T 19/20; G06T 2207/30204; G06K 7/10722;
(Continued)

(56) References Cited

U.S. PATENT DOCUMENTS

| 7,576,725 B2 * | 8/2009 | Bathiche | A63F 13/02 345/156 |
| 8,098,171 B1 * | 1/2012 | Szczerba | B60Q 9/008 340/438 |

(Continued)

OTHER PUBLICATIONS

Robert James Kapinos, Timothy Winthrop Kingsbury, Russell Speight Vanblon, Scott Wentao Li, Jonathan Gaither Knox, Arnold S. Weksler, John Carl Mese, Nathan J. Peterson, "Systems and Methods to Alter Presentation of Virtual Rendition Based on Real World Object", related pending U.S. Appl. No. 15/660,176, Applicant's response to non-final office action filed Oct. 11, 2018.

(Continued)

*Primary Examiner* — Abderrahim Merouan
(74) *Attorney, Agent, or Firm* — John M. Rogitz; John L. Rogitz

(57) ABSTRACT

In one aspect, a device includes at least one processor, a camera accessible to the at least one processor, a display accessible to the at least one processor, and storage accessible to the at least one processor. The storage includes instructions executable by the at least one processor to receive input from the camera and, based on the input from the camera, identify information related to a first real-world object. The instructions are also executable to, based on the identification of the information related to the first real-world object, present at least one augmented reality (AR) image on the display at a location of the display that does not obstruct a user's view of the first real-world object while the device is worn.

20 Claims, 9 Drawing Sheets

(51) Int. Cl.
  *G06K 9/00* (2006.01)
  *G06K 9/46* (2006.01)
  *G06K 19/06* (2006.01)
  *G06K 7/14* (2006.01)
  *G06K 7/10* (2006.01)
  *G06T 19/20* (2011.01)
  *G06F 3/01* (2006.01)

(52) U.S. Cl.
  CPC ..... *G06K 9/00288* (2013.01); *G06K 9/00671* (2013.01); *G06K 9/4661* (2013.01); *G06K 19/06037* (2013.01); *G06T 7/70* (2017.01); *G06T 19/20* (2013.01); *G06F 3/012* (2013.01); *G06T 2207/30204* (2013.01)

(58) Field of Classification Search
  CPC ............ G06K 7/1417; G06K 9/00288; G06K 9/00671; G06K 9/4661; G06K 19/06037; G06F 3/012
  See application file for complete search history.

(56) References Cited

U.S. PATENT DOCUMENTS

| | | | |
|---|---|---|---|
| 8,164,543 B2* | 4/2012 | Seder | G01S 13/723 340/461 |
| 8,547,298 B2* | 10/2013 | Szczerba | G01S 13/723 340/436 |
| 8,922,588 B2* | 12/2014 | Makino | G06T 19/006 345/633 |
| 9,292,974 B2* | 3/2016 | Kaino | G06T 7/73 |
| 9,734,634 B1* | 8/2017 | Mott | G06T 19/006 |
| 10,133,342 B2* | 11/2018 | Mittal | G06F 3/04842 |
| 10,347,002 B2* | 7/2019 | Dai | G06F 5/20 |
| 10,455,351 B1* | 10/2019 | Kiemele | G06F 3/011 |
| 10,460,139 B1* | 10/2019 | Gabriel | G06T 19/006 |
| 2008/0158096 A1* | 7/2008 | Breed | B60N 2/002 345/7 |
| 2008/0235724 A1* | 9/2008 | Sassenscheidt | G06F 16/784 725/32 |
| 2009/0109240 A1* | 4/2009 | Englert | G06T 7/73 345/633 |
| 2009/0189974 A1* | 7/2009 | Deering | G09G 3/02 348/46 |
| 2010/0079356 A1* | 4/2010 | Hoellwarth | G02B 27/017 345/8 |
| 2010/0287511 A1* | 11/2010 | Meier | G06T 15/20 715/848 |
| 2011/0138416 A1* | 6/2011 | Kang | H04N 21/42208 725/39 |
| 2011/0209099 A1 | 8/2011 | Hinckley et al. | |
| 2012/0075463 A1* | 3/2012 | Chen | G06F 3/017 348/135 |
| 2013/0079627 A1* | 3/2013 | Lee | A61B 8/5261 600/424 |
| 2013/0267838 A1* | 10/2013 | Frank | A61B 5/7425 600/424 |
| 2014/0168056 A1 | 6/2014 | Swaminathan et al. | |
| 2014/0184496 A1 | 7/2014 | Gribetz et al. | |
| 2014/0285518 A1* | 9/2014 | Tanaka | G02B 27/017 345/632 |
| 2015/0138223 A1* | 5/2015 | Sorkine Hornung | H04N 1/603 345/591 |
| 2015/0163345 A1 | 6/2015 | Cornaby et al. | |
| 2015/0302649 A1* | 10/2015 | Komatsu | G06K 9/00671 345/633 |
| 2015/0317518 A1* | 11/2015 | Fujimaki | G02B 27/017 345/633 |
| 2016/0041614 A1 | 2/2016 | Mok et al. | |
| 2016/0049013 A1* | 2/2016 | Tosas Bautista | G06T 19/006 345/633 |
| 2016/0163052 A1 | 6/2016 | Kim | |
| 2016/0189434 A1* | 6/2016 | Fong | G06T 19/20 345/633 |
| 2016/0253844 A1* | 9/2016 | Petrovskaya | G06Q 50/01 345/633 |
| 2016/0257199 A1* | 9/2016 | Bark | B60K 35/00 |
| 2016/0350601 A1* | 12/2016 | Grauer | G06K 9/00791 |
| 2016/0357406 A1 | 12/2016 | Lee et al. | |
| 2016/0379412 A1* | 12/2016 | Butler | G06T 19/006 345/633 |
| 2017/0053444 A1* | 2/2017 | Huang | G06T 19/006 |
| 2017/0068380 A1* | 3/2017 | Hong | G06F 3/0482 |
| 2017/0161950 A1* | 6/2017 | Seder | G02B 27/01 |
| 2017/0162177 A1* | 6/2017 | Lebeck | G06F 21/6218 |
| 2017/0168566 A1 | 6/2017 | Osterhout et al. | |
| 2017/0286061 A1 | 10/2017 | Tamai et al. | |
| 2017/0323485 A1 | 11/2017 | Samec et al. | |
| 2017/0343811 A1* | 11/2017 | Mese | G02B 27/0172 |
| 2017/0351544 A1 | 12/2017 | Park et al. | |
| 2018/0005406 A1* | 1/2018 | Dai | G06T 7/11 |
| 2018/0088185 A1* | 3/2018 | Woods | G01R 33/0035 |
| 2018/0101989 A1* | 4/2018 | Frueh | G06F 16/5838 |
| 2018/0158250 A1 | 6/2018 | Yamamoto et al. | |
| 2018/0239144 A1* | 8/2018 | Woods | G02B 27/0172 |
| 2018/0365855 A1* | 12/2018 | Laurent | G06T 7/74 |
| 2018/0365897 A1 | 12/2018 | Pahud et al. | |
| 2019/0073040 A1 | 3/2019 | Luchner et al. | |
| 2019/0217202 A1* | 7/2019 | Komori | A63F 13/65 |
| 2019/0261957 A1* | 8/2019 | Zaslavsky | A61B 8/54 |
| 2019/0270022 A1* | 9/2019 | Magpuri | A63G 25/00 |
| 2019/0272674 A1 | 9/2019 | Comer et al. | |
| 2019/0285896 A1* | 9/2019 | Kobayashi | G02B 27/0172 |
| 2019/0336864 A1* | 11/2019 | Magpuri | A63F 13/245 |
| 2020/0051527 A1* | 2/2020 | Ngo | G06F 3/04842 |
| 2020/0143600 A1* | 5/2020 | Dai | G06T 19/00 |
| 2020/0193938 A1* | 6/2020 | Estruch Tena | G06F 1/163 |
| 2020/0241733 A1* | 7/2020 | Drake | G02B 27/017 |

OTHER PUBLICATIONS

Rachel Metz, "How to Avoid Real Objects While in a Virtual World", Jun. 12, 2105, https://www.technologyreview.com/s/538336/how-to-avoid-real-objects-while-in-a-virtual-world/.

John Carl Mese, Arnold S. Weksler, Nathan J. Peterson, Russell Speight Vanblon, "Systems and Methods for Presentation of Images from Camera Concurrently with Presentation of Virtual Reality Content", file history of related U.S. Appl. No. 15/164,045, filed May 25, 2016.

Robert James Kapinos, Timothy Winthrop Kingsbury, Russell Speight Vanblon, Scott Wentao Li, Jonathan Gaither Knox, Arnold S. Weksler, John Carl Mese, Nathan J. Peterson, "Systems and Methods to Alter Presentation of Virtual Rendition Based on Real World Object", file history of related U.S. Appl. No. 15/660,176, filed Jul. 26, 2017.

John Carl Mese, Arnold S. Weksler, Nathan J. Peterson, Russell Speight Vanblon, "Systems and Methods for Presentation of Images from Camera Concurrently with Presentation of Virtual Reality Content", related U.S. Appl. No. 15/164,045, Board Decision dated Jun. 24, 2019.

John Carl Mese, Arnold S. Weksler, Nathan J. Peterson, Russell Speight Vanblon, "Systems and Methods for Presentation of Images from Camera Concurrently with Presentation of Virtual Reality Content", related U.S. Appl. No. 15/164,045, Applicant's response to Board Decision filed Jun. 28, 2019.

Robert James Kapinos, Timothy Winthrop Kingsbury, Russell Speight Vanblon, Scott Wentao Li, Jonathan Gaither Knox, Arnold S. Weksler, John Carl Mese, Nathan J. Peterson, "Systems and Methods to Alter Presentation of Virtual Rendition Based on Real World Object", related U.S. Appl. No. 15/660,176, Non-Final Office Action dated Aug. 2, 2018.

Adam, Jos J., Bovend'Eerdt, Thamar J.H., Van Dooren, Fleur E.P., Fischer, Martin H., Pratt, Jay, "The closer the better: Hand proximity dynamically affects letter recognition accuracy", Attention, Perception, & Psychophysics, Oct. 2012, vol. 74, Issue 7, pp. 1533-1538. Retrieved from https://link.springer.com/article/10.3758/s13414-012-0339-3#citeas.

(56) References Cited

OTHER PUBLICATIONS

Festman, Y, Adam, JJ, Pratt, J, Fischer, MH. "Both hand position and movement direction modulate visual attention". Frontiers in Psychology. 2013; 4:657. Retrieved from https://www.ncbi.nlm.nih.gov/pmc/articles/PMC3787593/.
Reed, C. L, Betz, R., Garza, J., & Roberts, R. (2010). Grab it! Biased attention for functional hand and tool space. Attention, Perception, & Psychophysics, 72, 236-245.
Reed, C. L., Grubb, J. D., & Steele, C. (2006). Hands up: Attentional prioritization of space near the hand. Journal of Experimental Psychology. Human Perception and Performance, 32,166-177, Abstract. Retrieved from https://www.ncbi.nlm.nih.gov/pubmed/16478334.
Rosenbaum, D. (2017). Knowing Hands. In Knowing Hands: The Cognitive Psychology of Manual Control (Book Description) Cambridge: Cambridge University Press. Retrieved from https://www.cambridge.org/core/books/knowing-hands/4F1226345954CA417750241003716971#fndtn-information.
Qian et al., "Presentation of Content Based on Attention Center of User", related U.S. Appl. No. 16/107,576, Non-Final Office Action dated Nov. 18, 2019.
Qian et al., "Presentation of Content Based on Attention Center of User", related U.S. Appl. No. 16/107,576, Applicant's response to Final Office Action filed Jul. 30, 2020.
Qian et al., "Presentation of Content Based on Attention Center of User", related U.S. Appl. No. 16/107,576, Final Office Action dated May 11, 2020.
Qian et al., "Presentation of Content Based on Attention Center of User", related U.S. Appl. No. 16/107,576, Applicant's response to Final Office Action dated Jan. 8, 2021.
Qian et al., "Presentation of Content Based on Attention Center of User", related U.S. Appl. No. 16/107,576, Final Office Action dated Dec. 18, 2020.
Qian et al., "Presentation of Content Based on Attention Center of User", related U.S. Appl. No. 16/107,576, Applicant's response to Non-Final Office Action filed Sep. 28, 2020.
Qian et al., "Presentation of Content Based on Attention Center of User", related U.S. Appl. No. 16/107,576, Non-Final Office Action dated Sep. 1, 2020.
Peterson et al., "Presentation of Graphical Object(s) on Display to Avoid Overlay on Another Item", file history of related U.S. Appl. No. 16/117,360, filed Aug. 30, 2018.
Qian et al., "Presentation of Content Based on Attention Center of User", related U.S. Appl. No. 16/107,576, Applicant's response to Non-Final Office Action filed Feb. 18, 2020.

\* cited by examiner

PRESENTATION OF AUGMENTED REALITY IMAGES AT DISPLAY LOCATIONS THAT DO NOT OBSTRUCT USER'S VIEW

BACKGROUND

Augmented reality (AR) devices are becoming increasingly prevalent in today's technology marketplace. However, as recognized herein, current AR devices often present AR content at areas of the AR device display that might obstruct a user's view of something from the real-world that the user might still wish to view while the AR content is presented. There are currently no adequate solutions to the foregoing computer-related, technological problem.

SUMMARY

Accordingly, in one aspect a device includes at least one processor, a camera accessible to the at least one processor, a display accessible to the at least one processor, and storage accessible to the at least one processor. The storage includes instructions executable by the at least one processor to receive input from the camera and, based on the input from the camera, identify information related to a first real-world object. The instructions are also executable to, based on the identification of the information related to the first real-world object, present at least one augmented reality (AR) image on the display at a location of the display that does not obstruct a user's view of the first real-world object while the device is worn.

In another aspect, a method includes receiving input from a camera that images a user's field of view while wearing a headset and identifying, based on the input from the camera, information related to a first real-world object. The method also includes presenting, based on the identifying of the information related to the first real-world object, an augmented reality (AR) graphic on a display of the headset at a location of the display that does not overlap the user's view of the first real-world object while the headset is worn.

In still another aspect, a computer readable storage medium (CRSM) includes instructions executable by at least one processor to receive input from a camera that images a user's environ while the user views the environment using a display of a device that presents augmented reality (AR) graphics and to, based on the input from the camera, identify at least one characteristic of a first real-world object indicated in the input. The instructions are also executable to, based on the identification of the at least one characteristic of the first real-world object, present an augmented reality (AR) image on the display at a location of the display that does not overlap the user's view of the first real-world object.

The details of present principles, both as to their structure and operation, can best be understood in reference to the accompanying drawings, in which like reference numerals refer to like parts, and in which:

DETAILED DESCRIPTION

Figure 1:
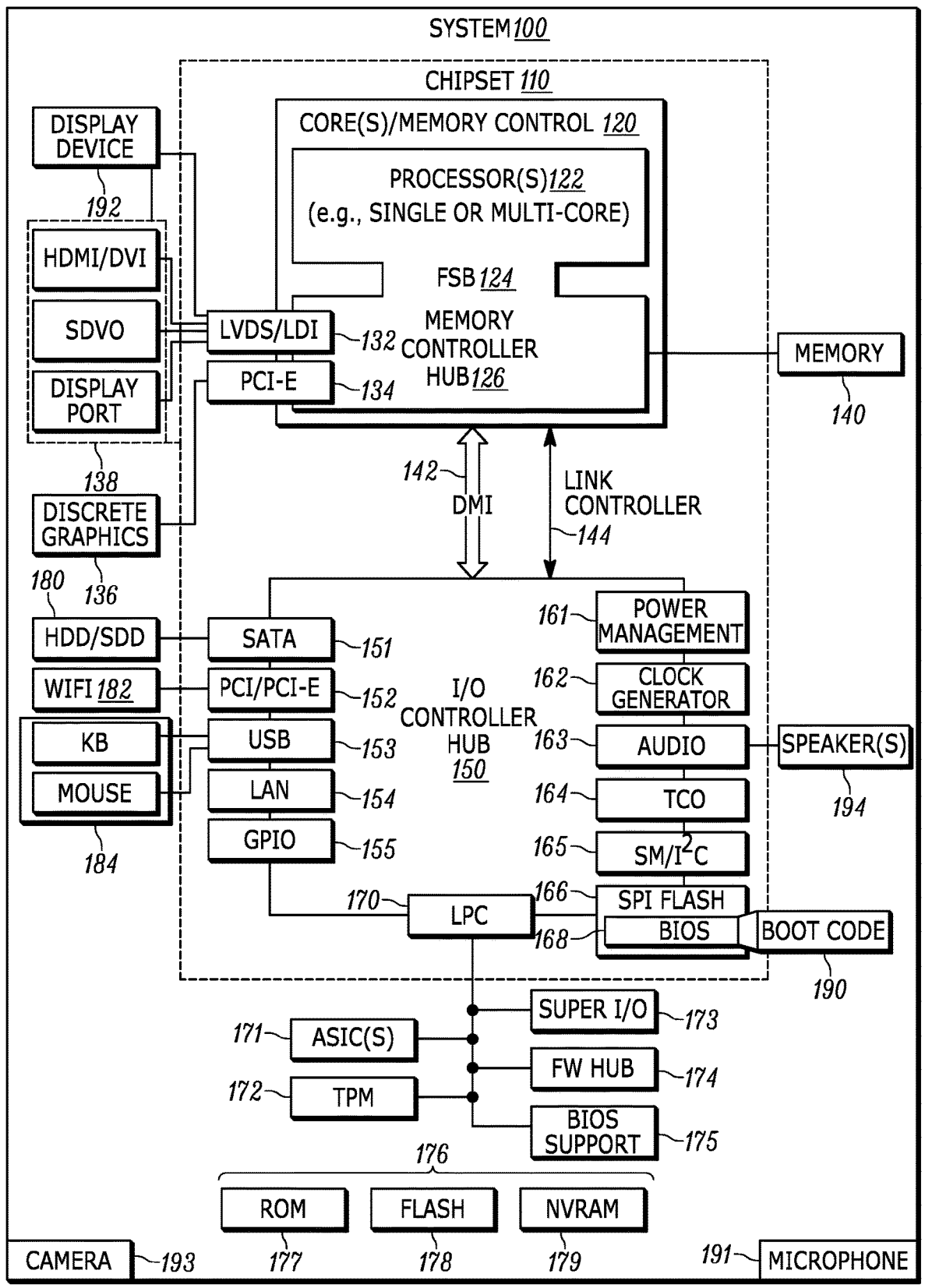
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CI) ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMID®, etc.).

In the example of FIG. 1, the chipset 110 has a particular architecture, which may vary to some extent depending on brand or manufacturer. The architecture of the chipset 110 includes a core and memory control group 120 and an 110 controller hub 150 that exchange information data, signals, commands, etc. via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller huh 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.)

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that may provide input from the microphone to the processor 122 based on audio that is detected, such as via a user providing audible input to the microphone. The system may also include one or more cameras 193 that may gather one or more images and provide them and related input to the processor 122. The camera(s) 193 may be a thermal imaging camera, a digital camera such as a webcam, an infrared (IR) camera, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1, In any case, it is to be understood at least based on the foregoing that the system 100 is configured to undertake present principles.

Figure 2:
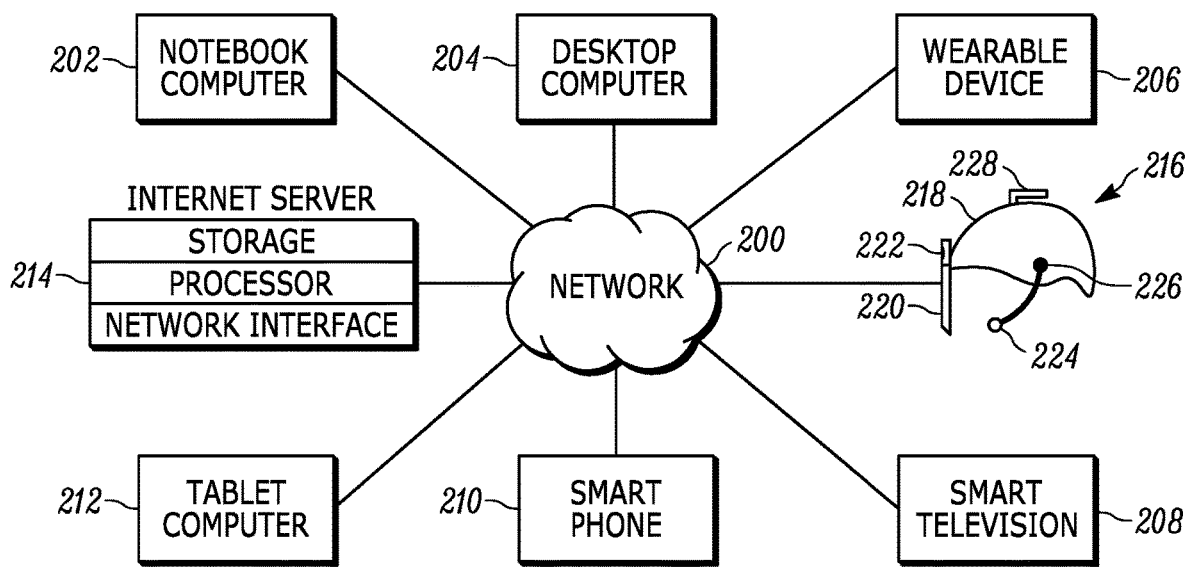
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212 and 216. It is to be understood that the devices 202-216 are configured to communicate with each other over the network 200 to undertake present principles.

Describing the headset 216 in more detail, it may be a virtual reality (VR) headset in some examples, an augmented reality (AR) headset in other examples, Internet-enabled computerized glasses in still other examples, another type of headset that may present virtual objects, etc. The headset 216 may include a housing 218 to which a display 220 is coupled for presenting content in accordance with present principles. The display 220 may be an at least partially transparent display such as a heads-up display and may permit a wearer of the headset to view real-world objects through it while wearing the headset 216, while also being configured to present content on the display 220 itself such AR images/graphics, etc.

The headset 216 may also include plural cameras 222 that may each be similar in function and configuration to the camera 193 described above, with at least one of the cameras 222 oriented to image a wearer's eyes when wearing the headset 216 for eye tracking as described herein (e.g., using infrared (IR)) and another of the cameras 222 being oriented away from the headset 216 to image the user's environment according to a field of view of the user. Accordingly, the camera(s) oriented away from the headset 216 to image the user's environment may be juxtaposed on the bridge of the headset 216 that extends between a user's eyes and over the user's nose while wearing the headset 216.

The headset 216 may also include a microphone 224 that may be similar in function and configuration to the microphone 191, a speaker 226 that may be similar in function and configuration to the speaker(s) 194, and one or more head-engagement members 228 for a user to dispose the headset 216 on his or her head. Though not shown for clarity, it is to be understood that the headset 216 may also include a network interface for wired and/or wireless communication with the other devices of FIG. 2 such as via the Internet, a local area network (LAN), a Bluetooth network, as well as a processor, storage, a battery pack or other power source, etc.

Figure 3:
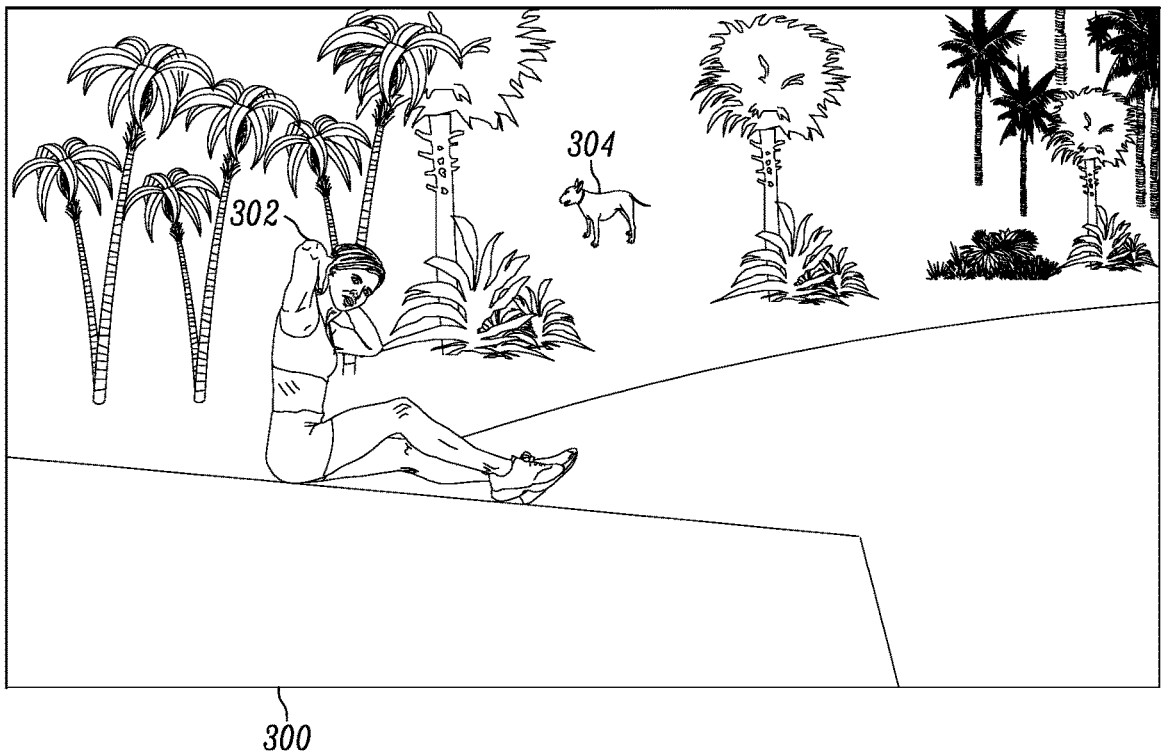
FIGS. 3-10 and 12 are example illustrations in accordance with present principles.

Referring to FIG. 3, it shows an example illustration 300 from the perspective of a user wearing an augmented reality (AR) headset (such as the headset 216) executing augmented reality software to present virtual/AR images and graphics in accordance with present principles. However, it is to be understood that for the example shown in FIG. 3, as well as the other examples discussed below, another type of mobile device such as a smart phone or tablet computer may also be used in accordance with present principles to present both a video feed of a real-world field of view (FOV) on its display along with AR images/graphics as set forth herein.

In any case, as may be appreciated from FIG. 3 an actual, real-world child 302 is in the user's FOV. A three-dimensional (3D) virtual image 304 of a dog is also shown. The image 304 is understood to be presented on the transparent display of the user's headset so that it appears, relative to the user wearing the headset as intended, to overlap the background of the user's FOV and hence does not obstruct the user's view of the child 302, or at the very least the user's view of the face of the child 302 specifically.

In accordance with present principles, this is accomplished by the headset receiving input from a camera on it that images the user's FOV to then execute object and/or facial recognition on the input to identify the child 302 as a person for which the user's view should not be blocked. Once the child 302 is identified, a display location through which the user is viewing the child relative to the user's current head/eye orientation may be mapped by identifying the user's line of sight to the child 302 using eye tracking software and identifying display location(s) through which the line of sight extends. The headset may then determine to present the image 304 elsewhere on the display.

Figure 4:
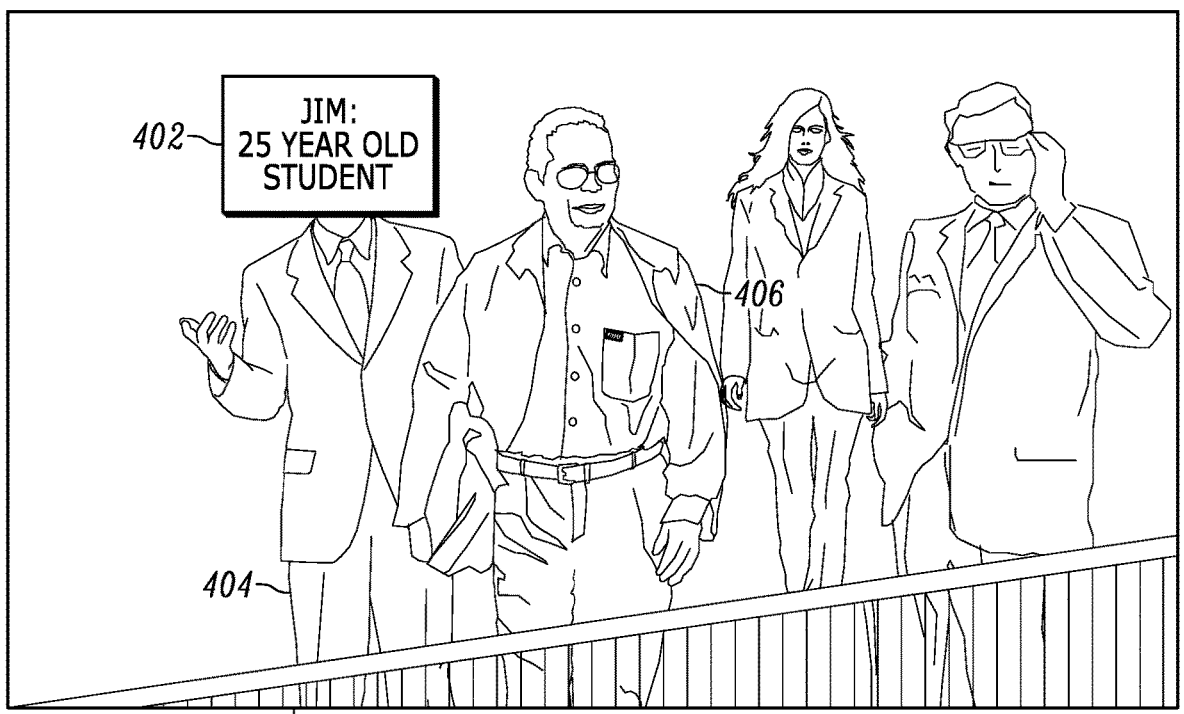

FIG. 4 shows another example illustration 400 in accordance with present principles from the perspective of the FOV of a user while wearing an AR headset. Distinguishing FIG. 3 from FIG. 4, in this case a virtual image 402 that includes textual data is presented so as to overlap the face of a real-world person 404 that the headset does not recognize as being an "important face" related to the user. However, owing to the headset having identified a real-world person 406 as being a cousin of the user based on camera input, execution of facial recognition, and identification of the recognized face as being a person related to the user, the user's view of the person 406 is not blocked.

The identification of the person 406 as being related to the user may be based on, for example, social media information indicating the relationship, user profile data provided by the user himself, entails between the user and the person 406, etc. Though a cousin is used in this example, note that the user's relationship to another person may be established not just by familial relationships but also friendships, spousal relationships and dating relationships, etc.

As for the image 402, owing to the person 406 being identified as associated with the user, the headset may present certain information pertaining to the user in text form as indicated in the image 402. In this example, the text information indicates the name of the person (Jim), the person's age (twenty-five years old), and the person's occupation (student).

Figure 5:
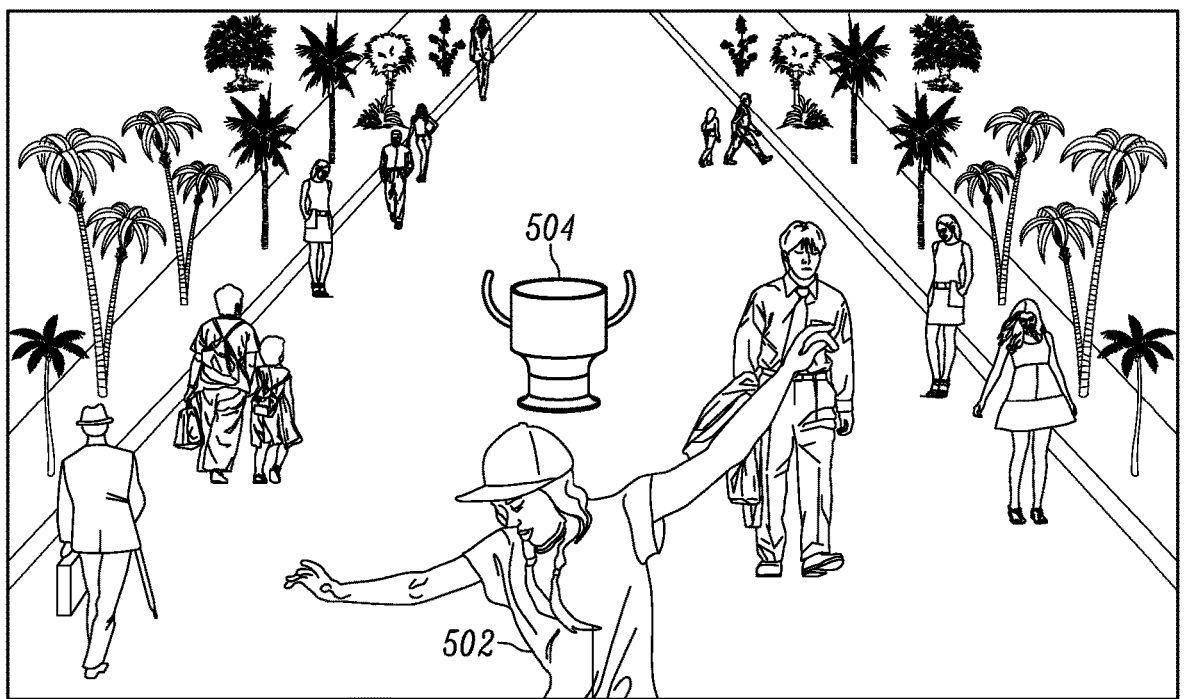

FIG. 5 shows yet another illustration 500 from the perspective of a user while viewing the real world through an AR headset in accordance with present principles. A real-world person 502 has been identified by the headset using input from the headset's camera and facial recognition. In contrast to the example of FIG. 4 above, even though the person 502 has not been identified as related to the user, the headset has identified the person 502 as being in a foreground of the user's FOV and accordingly a 3D virtual trophy 504 has been presented on the headset's display so as to overlap part of the background of the user's field of view.

Identifying whether an object/person detected from camera input is in the foreground or the background relative to the user may be based on, e.g., execution of spatial analysis software to analyze the size of the object/person from the camera input to determine how close the user is to the object/person. For example, distance to a person may be determined by correlating the size of the person as appearing in a camera image to a given distance since, e.g., the average size of an adult can generally be known as six feet tall. The headset may be preprogrammed to have a reference image size for a person (e.g., height as appearing in the image) that is correlated with a reference distance. Linear interpolation can be used to then associate smaller image sizes with greater distances than the reference distance and larger image sizes with lesser distances than the reference distance. However, note that laser rangefinders may also be used for determining distance, as well as echo location and other distance determining methods.

Once the distance to one or more objects/people with the user's FOV have been identified, the closest object/person to the user within the user's FOV may then be identified as being a foreground object/person, and other objects/people beyond that distance or beyond that distance by more than a threshold non-zero amount may then be determined to be in the background. Additionally, or alternatively, the headset may determine foreground objects/people by identifying all objects/people within the FOV that are located less than or equal to a threshold non-zero distance from the location of the user, with all objects/people beyond the threshold distance from the location of the user being determined to be background objects. Still further, objects/people that are too small or imperceptible to be recognized by the headset in the first place may also be determined to be in the background, as may "blank space" that might be established by clouds or the sky.

Figure 6:
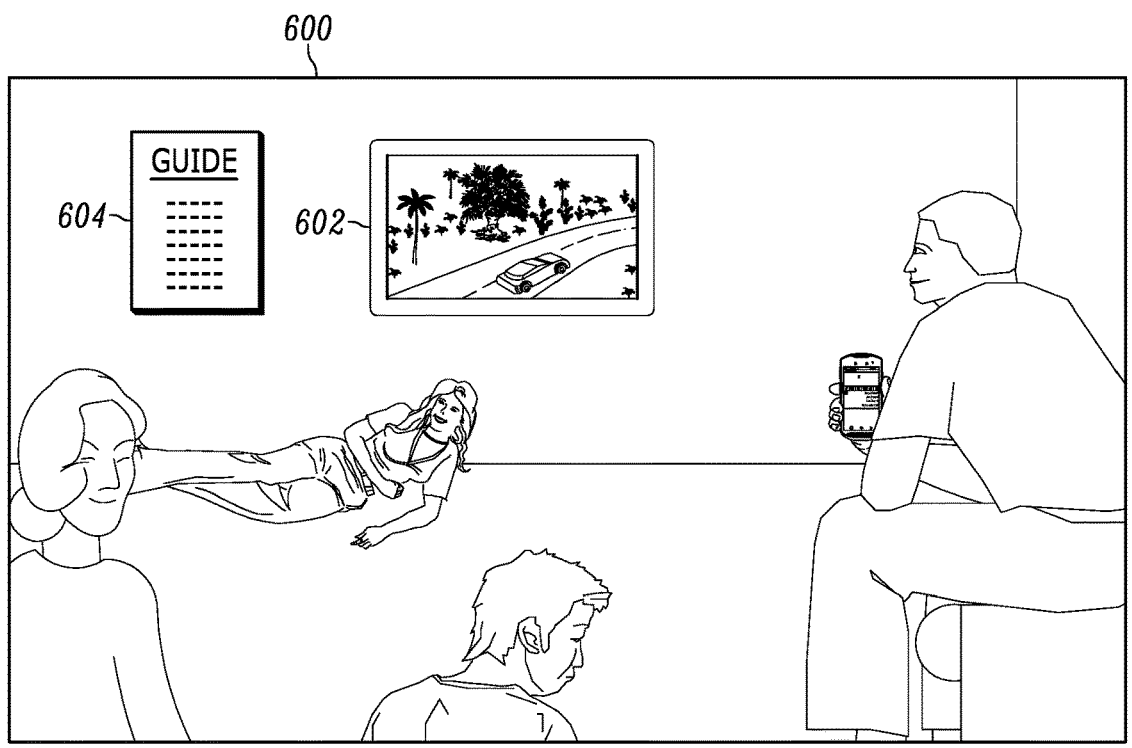

Now in reference to FIG. 6, it shows yet another example illustration 600 from the perspective of a user while viewing the real world through an AR headset in accordance with present principles. In this example, the headset has recognized, based on input from its camera and execution of object recognition, a television display 602 that is currently presenting images such as the live video feed of a particular television channel. Thus, based on the identification of the television display 602 as currently presenting images, a virtual channel guide 604 may be presented on the headset's display so that it appears, according to the user's FOV, to be adjacent to the television display 602 but not overlapping and hence not obstructing the user's view of the television display 602. In contrast, if the television display 602 where instead identified as not being powered on, or not presenting any information and instead having a blank screen, the headset may present AR content over top of it in some examples.

Figure 7:
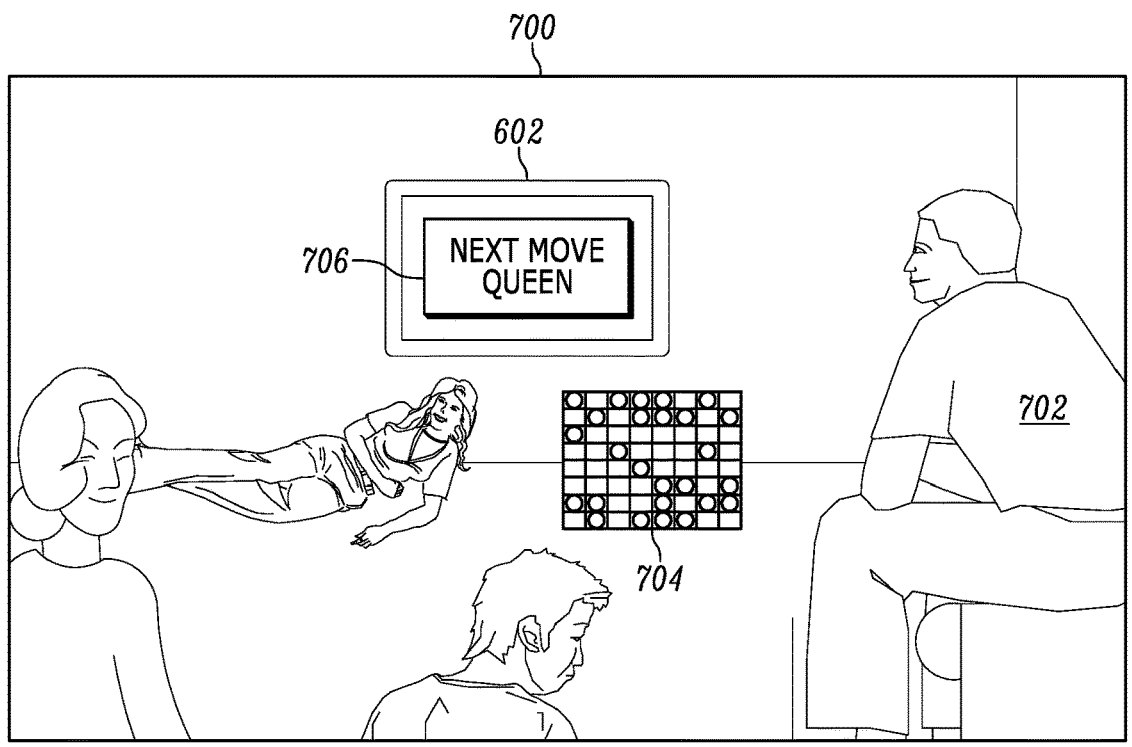

FIG. 7 shows an illustration 700 from a similar perspective as that shown in FIG. 6. However, in this example the television display 602 is not powered on and presenting images as in the previous example. Instead, various people 702 along with the user are shown as playing a real-world board game (checkers) 704 on the floor of the room in which they are located. Based on input from the headset's camera, the headset may execute object recognition to recognize the board game 704, and also people 702 and/or the user directing their gazes toward the board game 704. Based on those two recognitions, the headset may identify the people 702 and/or user as being engaged in the activity of playing the board game 704. Accordingly, an AR graphic 706 is presented on the headset's display to overlap the user's view of the television display 602 but to not obstruct the user's view of the board game 704. The AR graphic 706 may also be presented so as to not obstruct the faces of the other people identified as engaged in the same activity so that the user can see their facial expressions while engaged in the activity.

Figure 8:
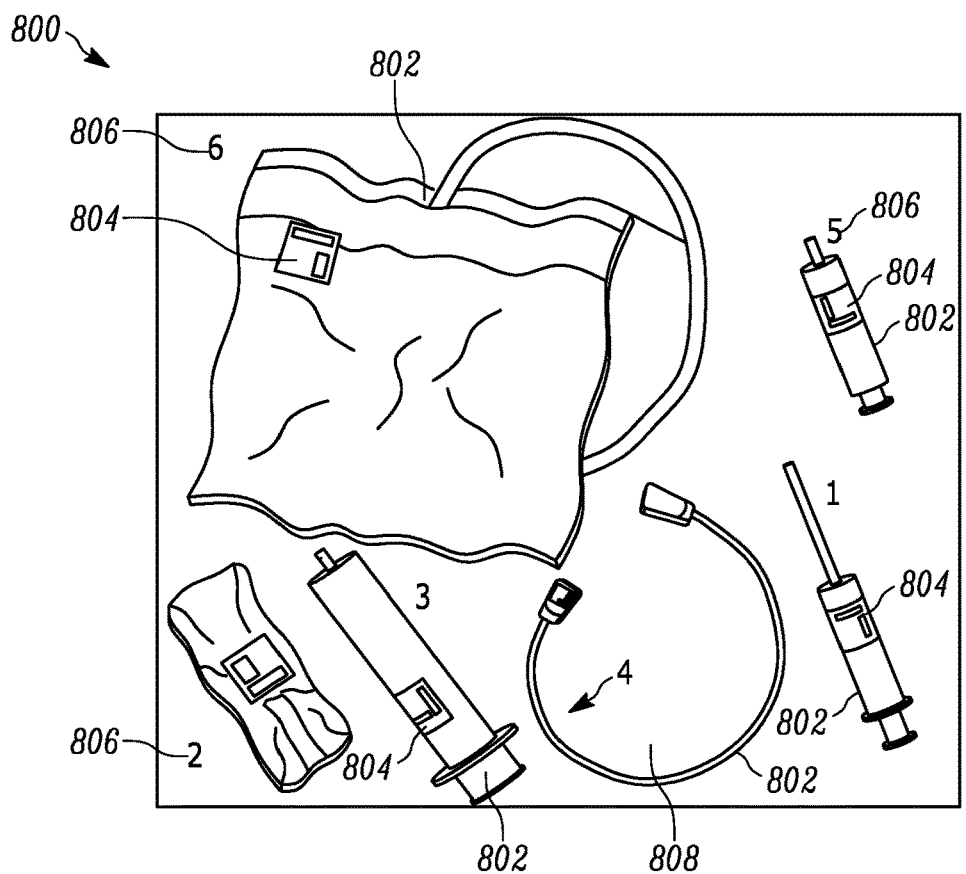

FIG. 8 shows yet another example illustration 800 in accordance with present principles. In this case, the FOV of the headset user is understood to be directed toward a table on which multiple medical instruments 802 have been placed. As may be appreciated from FIG. 8, each medical instrument 802 is coupled to a respective real-world coded marker 804 that is different from each of the other coded markers 804. The user or another person may have previously coupled a respective marker 804 to a respective instrument 802, scanned the coded markers 804 into a system accessible to the headset, and programmed each coded marker 804 to be associated in a relational database with the respective instrument 802 to which the respective marker 804 is coupled to thus designate those instruments 802 to not be obstructed by AR images/graphics. The programming may have been performed via, e.g., a graphical user interface presented on a display accessible to the system. In some examples, each coded marker 804 may be a different ArUco marker. However, in other examples different quick response (QR) code markers may be used, as well as different bar codes and other types of coded markers.

After this programming, the headset may then identify particular instruments 802 to not obstruct by identifying any coded markers 804 shown in images of the user's FOV and comparing them to the coded markers in the relational database to identify a particular instrument associated with an identified coded marker. Once the headset identifies one or more of the instruments 802, the headset may present three-dimensional graphical renderings 806 on the headset's display of different respective numbers associated with different ones of the instruments 802 so that each respective number 806 appears to the user to be adjacent to the respective instruments 802 itself. The numbers that are respectively associated with different instruments may have also been preprogrammed into the relational database.

This example may be if the user is a physician or other medical professional that is following instructions during a medical procedure, with the instructions indicating, by number, which of the instruments 802 to use at various steps of the procedure. Also note that a 3D graphical rendering 808 of an arrow is also shown to indicate a particular instrument (number four) to be used at a given step the user is currently at during the procedure. The headset may know which step of the procedure the user is on based on, e.g., input from the user to move to one step to the next or based on object recognition to track the user's actions as the user progresses through the procedure.

Furthermore, in some embodiments different headsets for different respective users may present different AR images/ graphics to their respective users based on context. For example, if a physician were wearing the headset described above in reference to FIG. 8 and a nurse were wearing a different headset while observing the same procedure, the physician's headset might present various AR information based on steps in the procedure that the physician is to perform and the coded markers for the physician's instruments, while the nurse's headset might present different AR information based on steps the nurse is to perform (or based on assistance the nurse is to give to the physician during the procedure) and the coded markers for the nurse's instruments. Furthermore, in such a situation neither headset may present AR information so as to obstruct the respective user's views of relevant devices for that user, even if obstructing the e's view of other instruments to be used by the other person. Views of EKG machines or the patient herself may also be left unobstructed.

What's more, if the headset is able to detect that a certain device is emitting a near field communication signal (such as a radio-frequency identification (RFID) signal or Bluetooth signal) using a direction of arrival algorithm or triangulation, the headset may determine that the device is important and should not be obstructed from view with AR information. Instead, the headset may present the AR information on other areas of its display that might only obstruct, e.g., an unused television that is not powered on or blank wall space in the procedure room.

Figure 9:
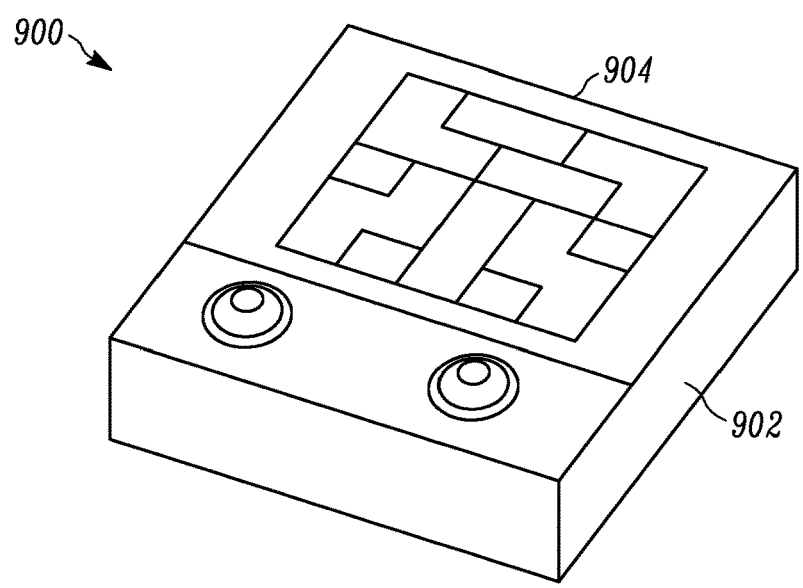

Continuing the detailed description in reference to FIG. 9, it shows another illustration 900 in accordance with present principles. In this case, a real-world robot vacuum 902 has been designated for unobstruction by AR images/graphics using an ArUco marker 904 that may be recognized by the headset based on images from the headset's camera that mimics the user's FOV. Thus, as the vacuum 902 moves about a room the headset may adjust presentation of any AR images or graphics that it is currently presenting on its transparent display so that the AR images/graphics do not obstruct the user's view of the vacuum 902 as it moves.

Note that in this example it is the existence of a coded marker as being coupled to an object that leads the headset to not obstruct the object's view with AR images or graphics, and that different coded markers and a relational database need not be employed. Instead, simply identifying any object as being coupled to any coded marker of a certain type may be used to determine to not obstruct the object with AR images/graphics.

Figure 10:
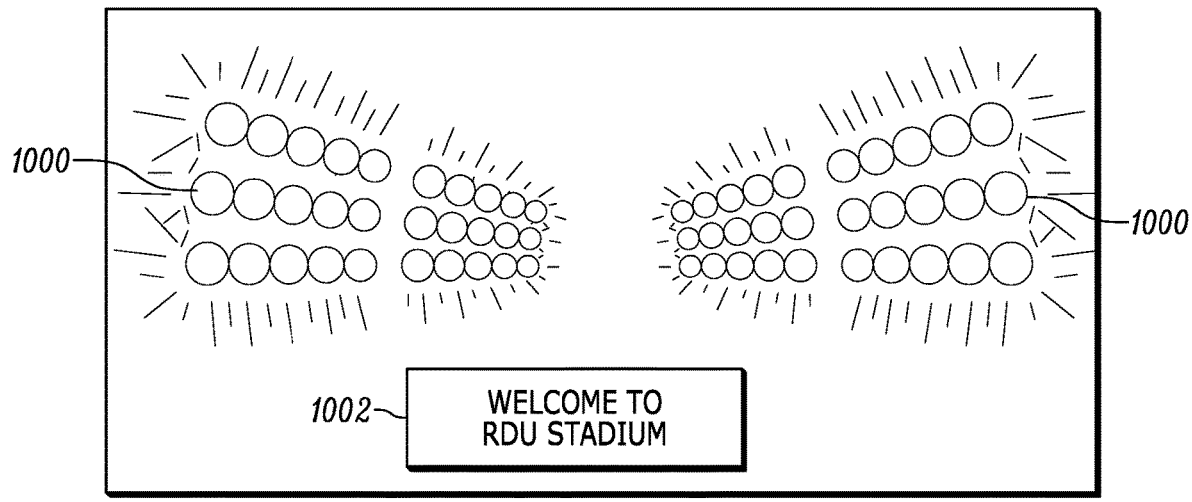

FIG. 10 further illustrates present principles. In FIG. 10, the of a user while wearing a headset includes real-world stadium lights 1000. The lights 1000 may be identified by executing object recognition using images from the headset's camera that images the user's FOV to thus identify the lights 1000 not just as existing but also as emitting light based on bright spots shown in the images. Based on that, the headset may then present an AR image of a stadium welcome message on the headset's transparent display so as to not obstruct or overlap the user's view of the lights 1000 through the display of the headset. In this way, not only are the lights 1000 not obstructed but also the AR image 1002 may remain visible since the lights 1000 might otherwise make the image 1002 difficult to see if presented on the headset's display in the direction of the lights 1000. Other examples of light sources in accordance with present principles include flashlights and the sun.

Figure 11:
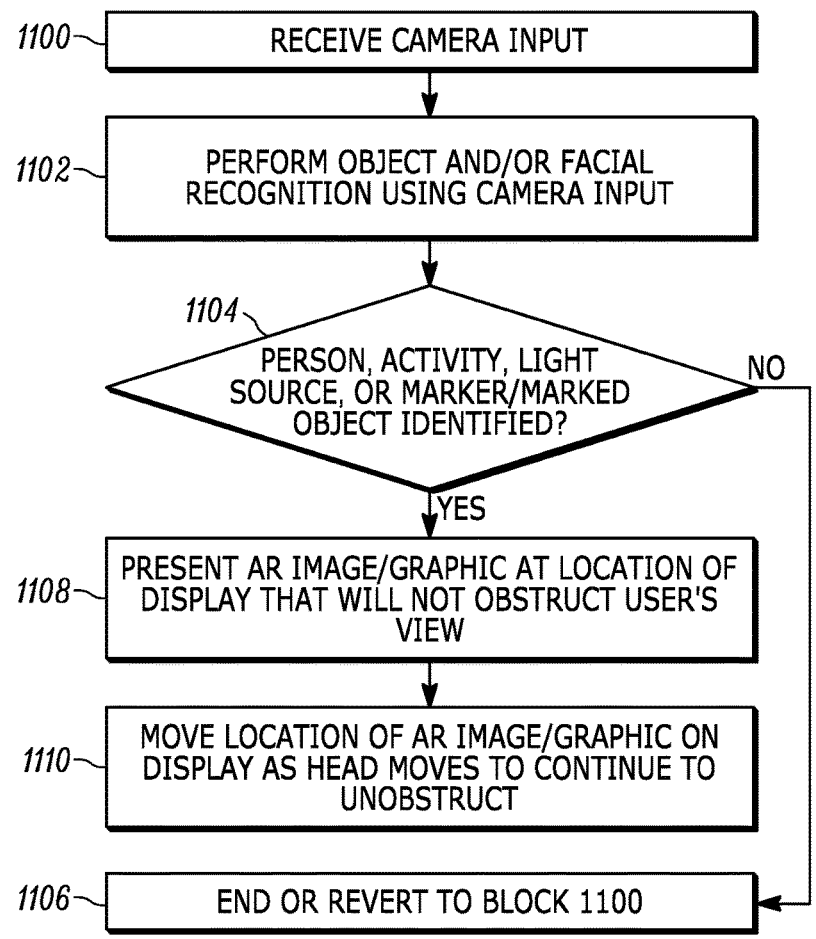
FIGS. 11 and 13 are flow charts of example algorithms in accordance with present principles.

Referring now to FIG. 11, it shows example logic that may be executed by the headsets disclosed herein, or by a smart phone or other mobile device that might also be undertaking present principles, e.g., in conjunction with the headset or on its own to present both real-world and virtual objects on its display. Note that while FIG. 11 illustrates the logic in flow chart format, state logic or other equivalent logic may be used.

Beginning at block 1100, the device may receive input from a camera that is imaging the user's field of view. Then at block 1102 the device may perform object recognition and/or facial recognition using the camera input to identify information related to, or characteristics of, at least one object (e.g., person or inanimate object) shown via the camera input. Then at decision diamond 1104 the device may make a determination related to the camera input, such as whether the camera input indicates any person, a particular person associated with the user of the headset, a light source that s currently emitting light, a coded marker, etc.

Responsive to a negative determination at diamond 1104, the logic may proceed to block 1106 where the logic may end or revert back to block 1100. However, responsive to an affirmative determination at diamond 1104, the logic may instead move to block 1108. At block 1108 the device may use augmented reality software/processing to present at least one AR image or graphic at a location of its display that will not obstruct the user's view of the identified real-world object.

Thereafter the logic may proceed to block 1110 where, as the user moves his head while wearing the headset, the device may move the location of the AR image/graphic as presented on the display from the initial location at which it was presented to a different location if the device determines that the AR image/graphic as presented at the initial location will now obstruct the user's view of the real-world object based on the user's head movement. Thus, it is to be understood that eye tracking using images from another camera on the headset that is oriented inward to image the user's eyes using, e.g., infrared (IR) light may be used to determine the user's line of sight and whether the AR image/graphic will initially or later obstruct the user's view of the real-world object as the user looks at the real-world object via the display and potentially moves his head relative to the object.

Furthermore, suppose that the device has identified two real-world people or inanimate objects for which AR images should not obstruct the user's view. Also suppose that there is not enough display space to present an AR image and still not obstruct both of the real-world people/objects at the same time. The device may perform eye tracking to identify a direction in which the user is looking and the corresponding person/object in that direction, and then shift presentation of the AR image to another display location that might partially overlap the other person/object not being looked at. However, the AR image may still be slightly offset from the person/object not being looked at so that the device can still distinguish between the user subsequently looking at the AR image as opposed to subsequently looking at the other person/object. This is because once the headset identifies that the user is now looking at the other person/object, presentation of the AR image may shift to a different display location (e.g., one that might overlap the previously looked-at person/object).

Figure 12:
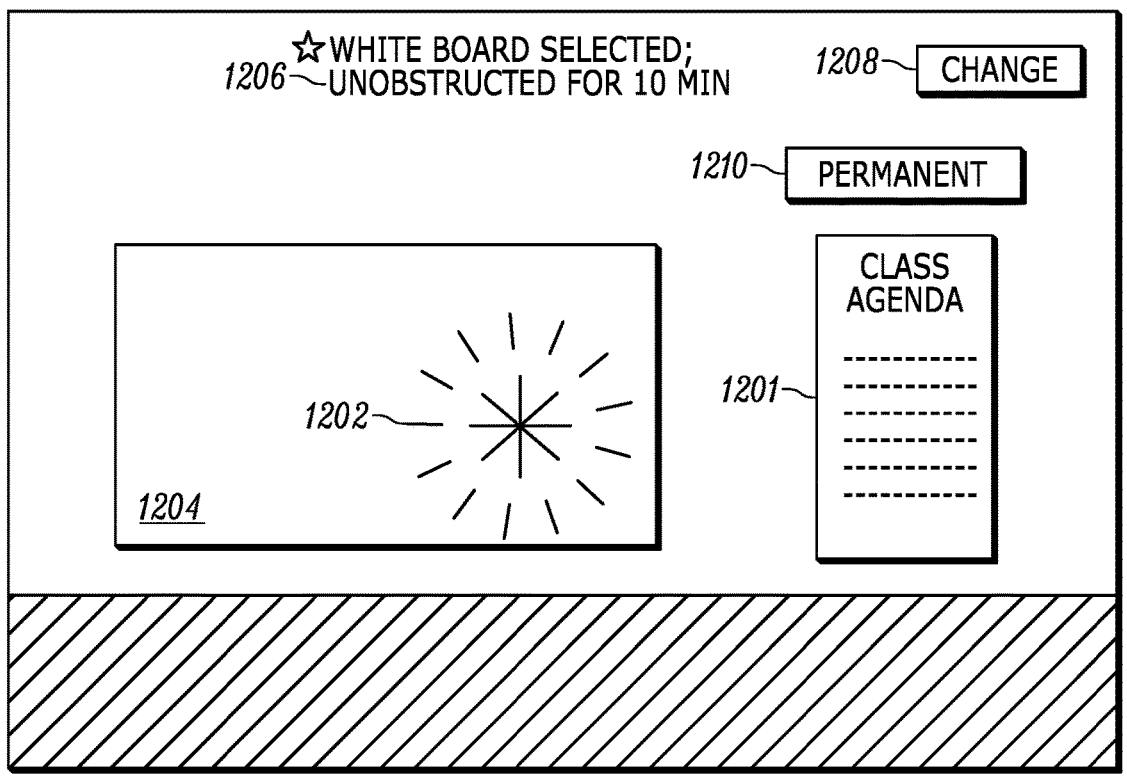

Now in reference to FIG. 12, it shows yet another illustration 1200 that demonstrates how a user might designate a particular real-world object or person for unobstruction by AR images/graphics in accordance with present principles. In this example, the AR image/graphic is a virtual representation of a class agenda 1201 and the user may designate a real-world object to not be obstructed by the agenda 1201 by directing visible light from a projector (e.g., a Pico projector) or laser toward the real-world object.

Accordingly, light 1202 hitting a real-world object 1204 is depicted in FIG. 12, with the object 1204 being a white board in a classroom in this case. The user's headset or another device imaging the white board 1204 may then detect the light hitting the white board 1204 and identify the white board 1204 using object recognition. Based only on detection of the light and then identification of the white board 1204 being the object hit by the light, the headset may then mark or designate the object for unobstruction in the future in, e.g., a relational database or profile listing items and whether they may be obstructed by AR images. However, in other embodiments the headset may mark or designate the white board 1204 for unobstruction in the future responsive to detection of the light against the white board 1204 as well as an additional command from the user, such as a gesture in free space to mark the object or selection of a button on the headset.

Then, whenever the headset subsequently identifies the white board 1204 via input from its camera that images the user's FOV, the headset may access the database or profile to determine that the white board 1204 has been designated for unobstruction. The headset may then not block the user's view of the white board 1204 with AR images such as the agenda 1201 while the user wears the AR headset and looks at the white board 1204. Instead, the AR images may be presented elsewhere on the headset's display. Other people's headsets may also be able to access the database or profile so that their own headsets may also not block the white board 1204 with AR images presented on their own displays.

Thus, it may be appreciated in accordance with the description of FIG. 12 that a user may "mark" no-blocking areas on the fly and the headset may use spatial anchors to anchor virtual markers for marked objects so that the headset can store the anchor locations for future use to leave the marked object unobstructed by AR images for both the user's headset as well as other people's headsets that also have access to that information. In some embodiments, the virtual markers may be permanent in that the associated objects may continue to be marked until the user unmarks them or otherwise provides input that AR images may now obstruct marked objects, such as a voice command to unmark a certain object.

In other embodiments, the virtual markers may only be in effect so long as the light continues to be reflected off of the white board 1204. However, in still other embodiments the virtual markers may be associated with a timer so that they may only exist or be operative for a threshold time and then the headset may subsequently block them with AR images. This feature is also reflected in FIG. 12, where virtual text 1206 indicates that the white board 1204 has been selected for unobstruction, but only for ten minutes. A change selector 1208 is also shown that is selectable using touch or cursor input to cause another GUI to be presented at which a user may change the threshold time from ten minutes to another amount of time. A permanent selector 1210 is also presented on the headset display and is selectable to provide a command for the headset to make the marker for the white board "permanent", e.g., until the user provides input to remove the marker.

Figure 13:
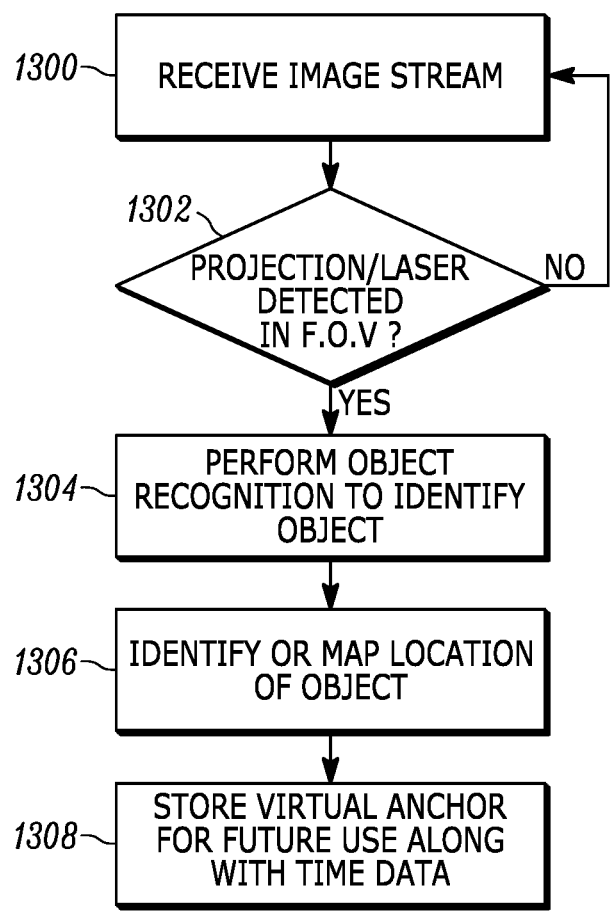

FIG. 13 shows logic in flow chart format that may be executed according to the example of FIG. 12 above. However, note that while FIG. 13 illustrates the logic in flow chart format, state logic or other equivalent logic may be used. In any case, the logic may begin at block 1300 where the headset may receive an image stream from a camera imaging a FOV of the user. The logic may then continue to decision diamond 1302 where the headset may determine whether projection of light onto an object in the FOV has been detected.

A negative determination at diamond 1302 may cause the logic to proceed back to block 1300 and proceed therefrom, while an affirmative determination at diamond 1302 may instead cause the logic to proceed to block 1304. At block 1304 the headset may perform object recognition using the image stream to identify the object being illuminated by the light/laser. The logic may then move to block 1306 where the device may identify or map the location of the object for future user, and then at block 1308 the device may store the virtual anchor for the object for future use along with any time-related metadata such as whether the virtual anchor is to be permanent or is to only be operative for a threshold time.

Figure 14:
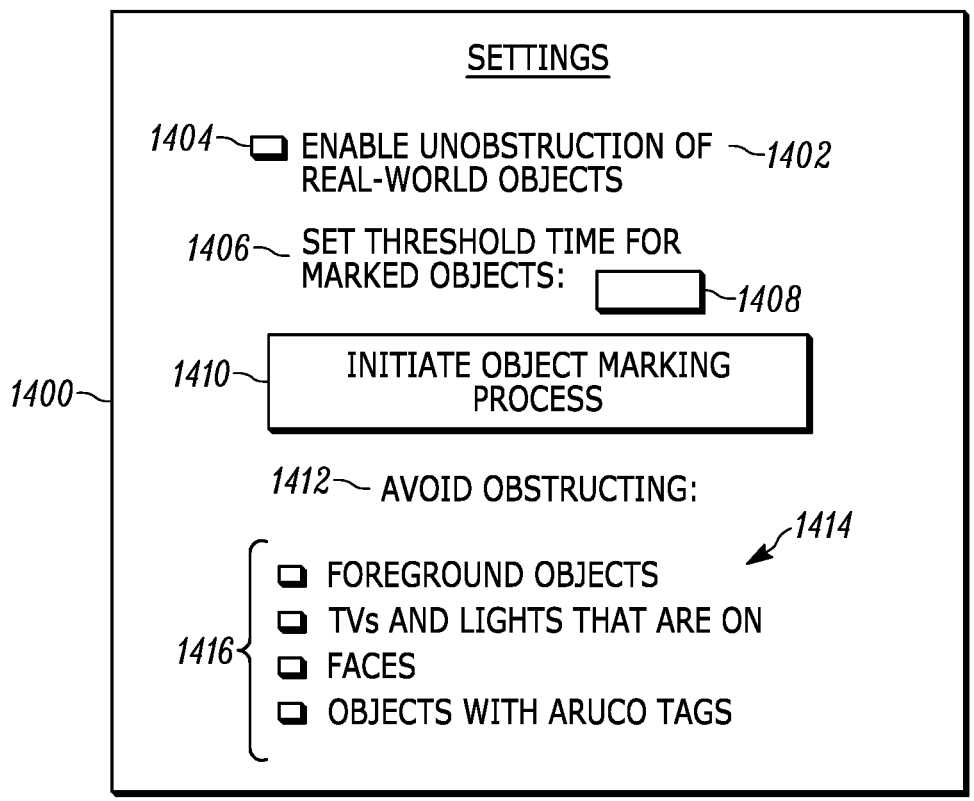
FIG. 14 is an example user interface (UI) in accordance with present principles.

Now in reference to FIG. 14, it shows an example graphical user interface (GUI) 1400 presentable on a headset display or display of another device in communication with the headset, to configure settings of a device or application that is configured to undertake present principles. As shown in FIG. 14, the GUI 1400 may include a first option 1402 that is selectable by directing touch or cursor input to check box 1404 to enable the headset to present AR images/objects in a way that does not obstruct real-world objects. For example, selection of the option 1402 may configure the device or application to undertake the logic of FIG. 11.

The GUI 1400 may also include an option 1406 for a user to set a threshold time for virtual markers as disclosed above, rather than them being permanent e.g., by default. Thus, an input box 1408 is shown to which a user may direct input to specify a threshold time. A selector 1410 is also shown beneath the input box 1408, with the selector 1410 being selectable to initiate the object marking process described above in reference to FIGS. 12 and 13.

The GUI 1400 may also include an option 1412 for a user to select one or more particular object types 1414 for which the device is to not block the user's view with AR images/objects. Each object type 1414 may be accompanied by an adjacent check box 1416 to select the respective object type 1414. In the example shown in FIG. 14, the object types 1414 include objects in the foreground of the user's FOV, television displays and light sources that are emitting light, faces of other people, and objects that have ArUco tags attached to them. Other types of objects may also be included.

It may now be appreciated that the present application provides computer-based techniques to adapt the placement of one or more pieces of augmented reality information on a scene based on context, the content of the AR information, viewer focus and viewer position, etc. This may result in an improved computer-based user interface that improves the functionality and ease of use of an AR-enabled device.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed:

1. A device, comprising:
   at least one processor;
   a camera accessible to the at least one processor;
   a first display accessible to the at least one processor; and
   storage accessible to the at least one processor and comprising instructions executable by the at least one processor to:
   receive input from the camera;
   based on the input from the camera, identify information related to a first real-world object, the identification of the information comprising identifying the first real-world object as being an electronic display and also identifying the electronic display as not presenting information, the electronic display establishing a second display different from the first display; and
   based on the identification of the information related to the first real-world object comprising the identifications of the first real-world object as being an electronic display and not presenting information, present at least one augmented reality (AR) image on the first display at a location of the first display that obstructs a user's view of at least part of the first real-world object while the device is worn such that the location overlaps at least part of the first real-world object according to the user's field of view.

2. The device of claim 1, wherein the device comprises a headset, and wherein the first display is an at least partially transparent display through which the user can view real-world objects while wearing the headset.

3. The device of claim 1, wherein the device comprises at least one mobile device selected from the group consisting of: a smart phone, a tablet computer.

4. The device of claim 1, wherein the at least one AR image comprises a three-dimensional (3D) object presented on the first display using augmented reality software.

5. The device of claim 1, wherein the location is a first location, wherein the AR image is a first AR image, and wherein the instructions are executable by the at least one processor to:
   based on input from the camera, identify a second real-world object as being designated for unobstruction by identifying of a laser as illuminating the second real-world object; and
   based on the identification of the second real-world object as being designated for unobstruction, present a second AR image on the first display at a second location, the second location not overlapping the second real-world object according to the user's field of view.

6. The device of claim 1, wherein the instructions are executable to:
   present a graphical user interface (GUI), the GUI comprising a setting that is selectable to enable the device to, in the future, present AR images at display locations that do not obstruct the user's view of objects that are to be left unobstructed from view.

7. The device of claim 1, wherein the identifying of the electronic display as not presenting information comprises identifying the electronic display as being powered off.

8. The device of claim 1, wherein the identifying of the electronic display as not presenting information comprises identifying the electronic display as having a blank screen.

9. A method, comprising:
   receiving input from a camera that images a user's field of view while wearing a headset, the headset comprising a first display;
   identifying, based on the input from the camera, information related to a first real-world object including that the first real-world object is a second display that is not currently presenting images, the second display being different from the first display; and
   presenting, based on the identifying of the information related to the first real-world object including that the first real-world object is the second display that is not currently presenting images, an augmented reality (AR) graphic on the first display at a location of the first display that overlaps at least part of the user's view of the first real-world object while the headset is worn.

10. The method of claim 9, wherein the input from the camera is first input, and wherein the method comprises:
    identifying, based on second input from the camera, a second real-world object as being previously designated by a person for unobstruction using a laser; and
    based on the identifying the second real-world object as being previously designated by a person for unobstruction using a laser, present at least one AR graphic on the first display at a location of the first display that does not overlap the user's view of the second real-world object while the headset is worn.

11. The method of claim 9, wherein the identifying of the information that the first real-world object is a second display that is not currently presenting images comprises identifying the second display as being powered off.

12. The method of claim 9, wherein the identifying of the information that the first real-world object is a second display that is not currently presenting images comprises identifying the second display as currently having a blank screen.

13. A computer readable storage medium (CRSM) that is not a transitory signal, the computer readable storage medium comprising instructions executable by at least one processor to:
 identify, at a first device, a second device as emitting at least one wireless signal, the second device being different from the first device; and
 based on the identification of the second device as emitting at least one wireless signal, present a first augmented reality (AR) image on a display of an apparatus at a location of the display that does not overlap the user's view of a first real-world object through the display.

14. The CRSM of claim 13, wherein the first AR image comprises a three-dimensional rendering of a graphical object.

15. The CRSM of claim 13, wherein the at least one wireless signal comprises a near field communication signal.

16. The CRSM of claim 13, wherein the at least one wireless signal comprises a radio-frequency identification (RFID) signal.

17. The CRSM of claim 13, wherein the at least one wireless signal comprises a Bluetooth signal.

18. The CRSM of claim 13, wherein the identification of the second device as emitting at least one wireless signal is executed at least in part using a direction of arrival algorithm.

19. The CRSM of claim 13, wherein the identification of the second device as emitting at least one wireless signal is executed at least in part using triangulation.

20. The CRSM of claim 13, wherein the apparatus comprises the first device.

* * * * *